Feb. 1, 1966   J. A. OGLE ETAL   3,233,216
OPTICAL FIELD SCANNING APPARATUS FOR LANDING AIRCRAFT
Filed April 6, 1962   4 Sheets-Sheet 1

INVENTORS.
JAMES A. OGLE
DOMENIC J. TURCHI
BY
Carl Fissell Jr.
AGENT

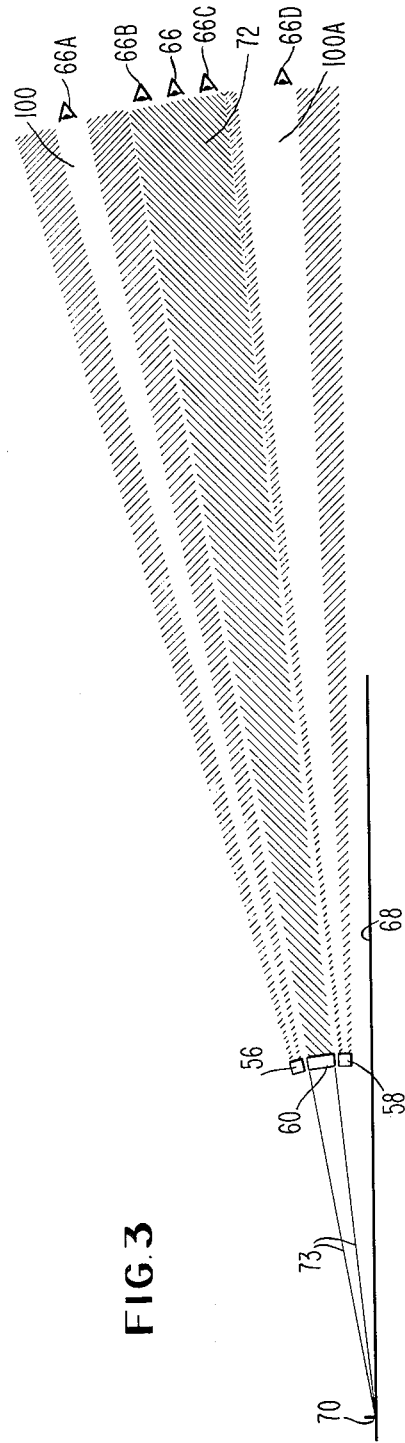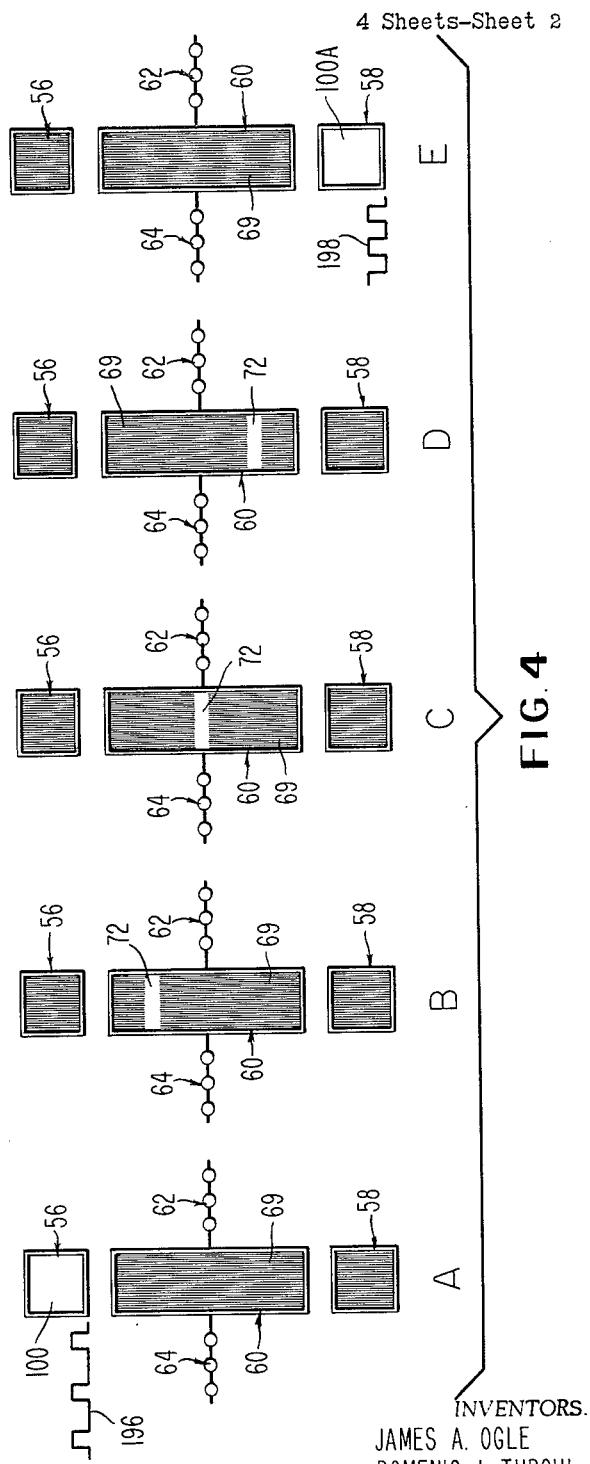

Feb. 1, 1966    J. A. OGLE ETAL    3,233,216
OPTICAL FIELD SCANNING APPARATUS FOR LANDING AIRCRAFT
Filed April 6, 1962    4 Sheets-Sheet 3

INVENTORS.
JAMES A. OGLE
DOMENIC J. TURCHI
BY Carl Fissell Jr.
AGENT

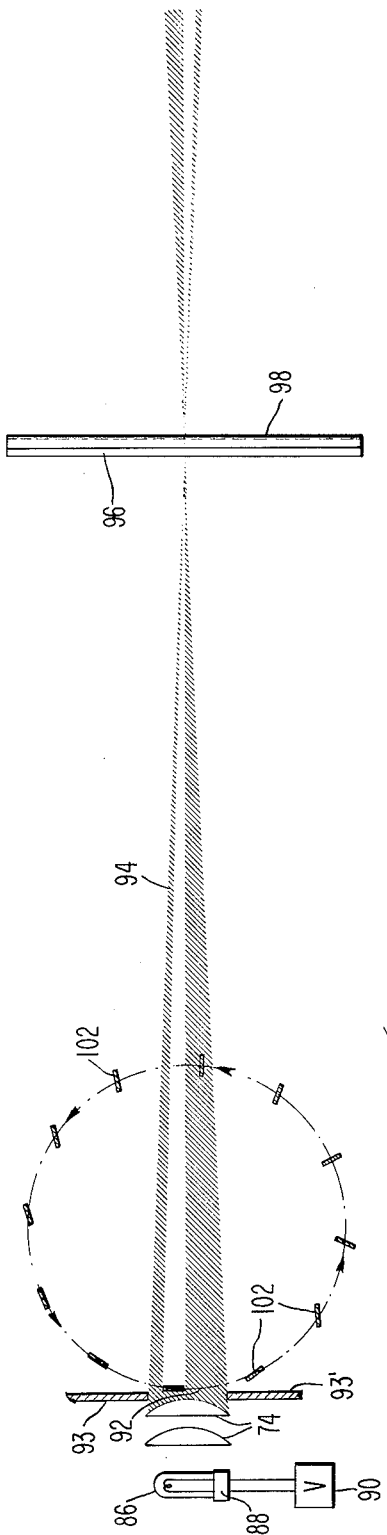
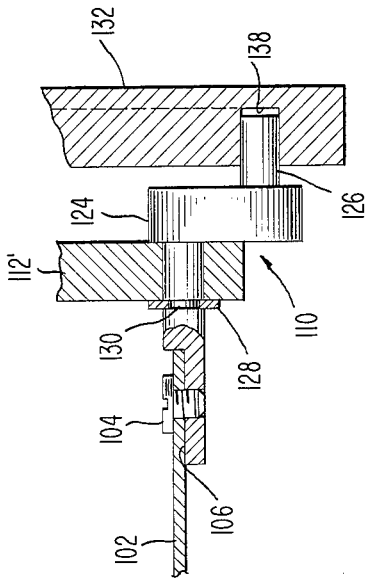
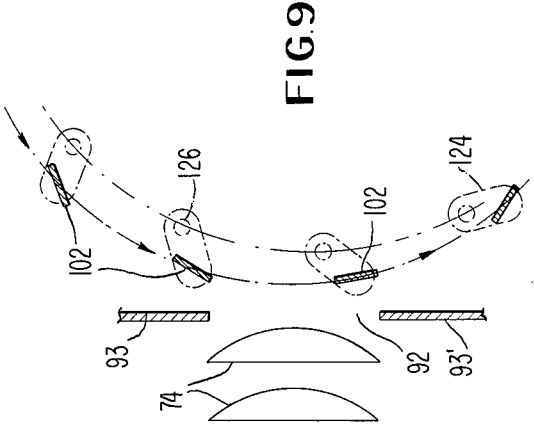
INVENTORS.
JAMES A. OGLE
DOMENIC J. TURCHI
BY
AGENT

United States Patent Office 3,233,216
Patented Feb. 1, 1966

3,233,216
OPTICAL FIELD SCANNING APPARATUS
FOR LANDING AIRCRAFT
James A. Ogle, Paoli, and Domenic J. Turchi, Norristown, Pa., assignors to Burroughs Corporation, Detroit, Mich., a corporation of Michigan
Filed Apr. 6, 1962, Ser. No. 185,540
6 Claims. (Cl. 340—26)

The present invention relates to optical field scanning apparatus for use as aircraft instrument landing equipment and, more particularly, to novel optical instrument landing apparatus including means for providing visual indications of the relative position of the aircraft with respect to a predetermined reference as the aircraft is making a descent toward a landing field. Still more particularly, the invention has to do with a novel optical apparatus wherein means is provided for producing a coded light output from an optical field scanning system thus to provide a visual indication of the pilot's relative position above or below a reference glide path leading to an airport runway, carrier deck or the area surrounding such location.

The present invention may be used alone or in conjunction with apparatus of the type described and claimed in Patent No. 2,991,743, for an "Optical Device for Image Display," in the name of James A. Ogle, assigned to the same assignee as the present invention.

In the patented apparatus a plurality of cells, each comprising reference lights and lenses disposed in a manner such that a virtual image of the reference lights is produced, is provided with means permitting an image of the lights to be seen by a pilot making a landing approach as a horizontal band or bar of light which appears to move vertically up or down depending upon the aircraft's angle of approach to the area in which the system is located. Associated with the assembly but external thereto are fixed rows of lights which establish a datum line. The correct glide angle is indicated by the visual alignment of the bar of light with the datum line. Once having made the necessary adjustments to the angle of descent the pilot is required only to maintain a steady course to achieve the proper touchdown point for a safe landing.

The present invention is compatible with existing aircraft glide path indicators but also supplies additional visual indications as to the aircraft's position relative to the desired glide path plane or dihedral tolerance range prior to the actual interception of this path. Additionally, the invention solves the problems involved in avoiding obstructions during an approach which is off course relative to a normal glide path plane and/or of flying into, through and beyond the glide path if the approach is high or low relative thereto. Apparatus embodying the present invention performs as a field scanning device having low out of field modulation, i.e., low residual information outside of the assigned observer field.

It is an important object of the present invention to provide optical field scanning apparatus for enabling aircraft to land safely in areas of restricted size.

It is another object of the invention to provide optical display apparatus for projecting a modulated source of light to a specific viewer with respect to a desired plane of reference.

A still further object of the invention is to provide an out of range indication means for glide path apparatus.

Still another object is to provide apparatus for displaying a modulated light source to a relatively sharply defined viewing area so that an approaching aircraft can fly with respect to the boundaries of this viewing area.

Another object is to provide optical instrument landing glide path indicating apparatus which is compatible with already existing glide path indicators.

Another object is to increase the vertical output field indications of glide path apparatus.

Another object is to provide self identification of the high and low indications of glide path apparatus by means of visual coding.

Still another object of the invention is to extend the useful distance range of the observed indication.

In accordance with the foregoing objects and first briefly described, the invention comprises optical field scanning apparatus wherein a plurality of interposing or occluding members driven at a desired rate, are operable in a manner such that the members traverse, a space substantially within the object plane of the optical system presenting their occluding aspect thereto, thereafter returning partly outside of the light system, partly through the light system in a space substantially removed from the object plane in which the members are so rotated as to present their least occluding aspect to the light in the system, thus to cause the light in the optical system to appear to flash thereby indicating the relative position of an observer with respect to the light source as well as with respect to any obstacles intermediate the observer and the optical apparatus.

FIG. 3 is an elevational schematic view illustrating the arrangement of apparatus embodying the present invention relative to a fixed position such as a landing field, or the deck of a ship;

FIGS. 4A through 4E are a series of schematic views of an optical instrument landing system embodying the invention and presenting various indications which an observer would derive as his position is changed in accordance with the changed positions illustrated in FIG. 3;

FIG. 7 is a detail view along the line 7—7 of FIG. 6;

FIG. 8 is a schematic representation of a portion of the optical system of the invention; and FIG. 9 is a detail view of a portion of the camming mechanism of FIG. 6.

Figure 1:
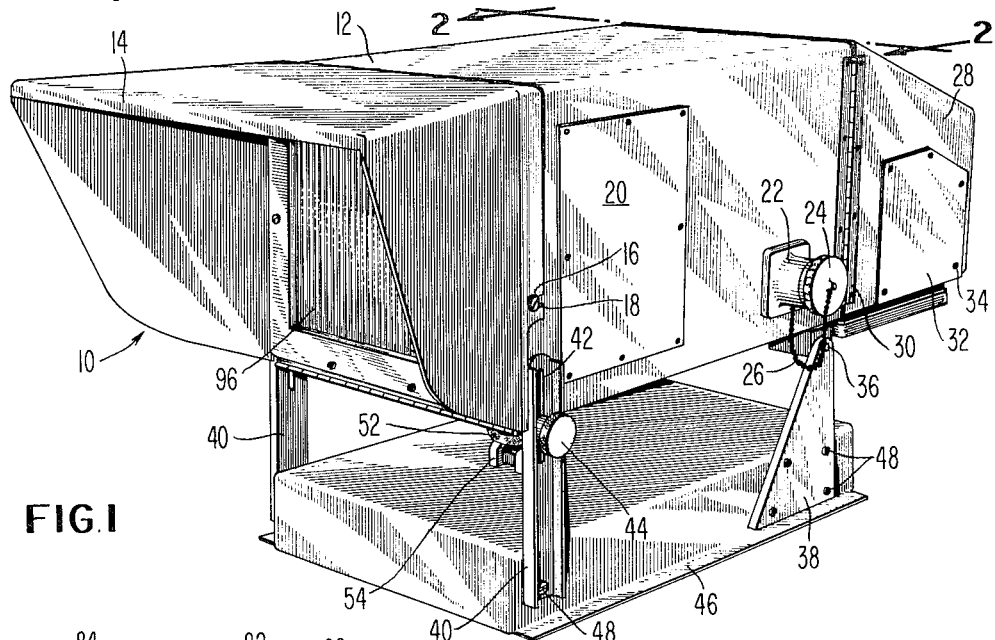
FIG. 1 is a perspective view of the preferred embodiment of the invention.

As seen with reference to FIG. 1, the preferred embodiment of the optical field scanning apparatus 10 is or may be supported and contained in a multi-part housing including a central box-like cabinet or enclosure 12 for housing the major optical elements of the present invention to be described herein later on. A removable hood 14 is demountably secured to the housing 12 by means of the bolts 16 which project through slotted openings 18 in the rear periphery of the hood 14 for engagement with the edges of the enclosure 12. An access hatch 20 is provided in the side of the enclosure 12 together with one or more electrical conduit connectors 22 each including a sealing cap 24 threadedly secured thereto in a known fashion, and retained when detached therefrom, as by a chain 26.

A rear enclosure member 28 also of box-like configuration, is secured to the central housing 12 by means of a hinge 30 attached to the cover 28 on the one side and the enclosure 12 on the other thereby permitting the cover to be swingably mounted thereto. A clasp (not shown) is provided on the opposite side of the rear structure for retaining the member 28 in its closed position. The rear enclosure houses a cooling fan and other associated equipment (not shown) to which access may be had for inspection, maintenance, etc., through a hatch 32 secured to the member 28 as by bolts 34.

The unitary assembly 10, hereinafter referred to as a

"cell" is pivotally mounted by means of pins 36 disposed through the upwardly projecting portions or apices of oppositely disposed rear triangularly shaped legs 38. Parallel, oppositely disposed front legs 40, each having an elongated slot 42 in the upper end thereof through which the shank of a knurled nut 44 passes to engage the enclosure 12, permit the cell 10 to be adjustably positionable vertically upwardly and downwardly relative to a base member 46 on which the cell is or may be mounted by means of bolts 48. Adjustment, e.g., raising—lowering—leveling off, is provided by means of a knurled nut 52 cooperatively engaging a slotted block 54 in a known manner.

As will be brought out more particularly hereinafter, the present invention may be employed as an optical glide path system arrangement such as that illustrated in FIGS. 3 and 4 wherein a "high" and "low" cell 56 and 58 respectively, each includes one of the assemblies 10. In such an arrangement the cells 56 and 58 are or may be disposed respectively above and below a lens assembly 60, FIG. 4, substantially similar to the assembly 30 of Patent No. 2,991,743, earlier referred to herein, wherein two fixed rows of datum lights 62 and 64 similar to lights 20 of the patent are arranged on either side of the assembly 60 perpendicular to the center of the assembly.

An observer 66, FIG. 3, for example, a pilot making a descent to a landing area 68, such as a ground runway or an aircraft carrier flight deck, observes a virtual image 70 provided by the lens assembly 60 and seen through the viewing window 69 as a horizontal bar of light 72 as depicted in FIG. 4B, 4C, and 4D respectively. The lines 73 which represent light rays appearing to emanate from point 70 define an angle within which an observer stationed at the right of the lenses would be able to view the virtual image. The apparent virtual position of the image is observed in relation to the two rows of datum lights 62 and 64. As the pilot approaches the landing area 68, if his approach is too high he will view the bar of light 72 approximately in the position of FIG. 4B; and if his approach is too low for example, below the optimum glide path angle, he views the bar of light in the approximate position shown in FIG. 4D. If, in contrast to the foregoing, he is "on course" he sees the bar of light 72 centered and aligned horizontally with the lights 62 and 64 as illustrated in FIG. 4C.

In order to obtain adequate vertical sensitivity, in such apparatus, without making the overall height thereof excessive, the total range through which the indication or light output is visible, i.e., the vertical angle of the viewer or output field necessarily is limited. As seen more particularly with reference to FIG. 3, the observer 66B is at the upper limit of the observation or indication while observer 66C is at the lower limit of the observation or indication.

In the preferred embodiment of the apparatus aforedescribed, a vertical output field, that is, the horizontal observer or viewer angle in the order of 1.5 degrees is provided with a boundary definition of approximately 0.1 degree. The horizontal output field approaches 40 degrees with the somewhat softer boundary definition of 2 to 3 degrees. This narrow vertical output field creates pilot location problems, in that with such a relatively small vertical observer angle a pilot attempting to pick up the indication of the optical landing system would run the risk of passing through this observer angle before he had received adequate signal information relative to his proper glide path angle for suitable and safe descent to the runway. Thus it is seen that without more information, any observation substantially above or below the points indicated by the reference characters 66B and 66C respectively, are outside of the source light indication and thus the pilot would be unable to determine whether he is above or below the suitable glide path angle for starting his descent approach.

The present invention as beforementioned is compatible with existing glide path systems and moreover supplies additional information as to the observer's i.e., pilot's position relative to the desired glide path output field prior to the actual interception of the field by the pilot. Also, the invention provides means for increasing the vertical field or observer angle without impairment of the sensitivity of the "on course" indication and for substantially increasing the beam candlepower of the light sources employed for long range signals thus to ease the pilot's source location problems.

Figure 2:
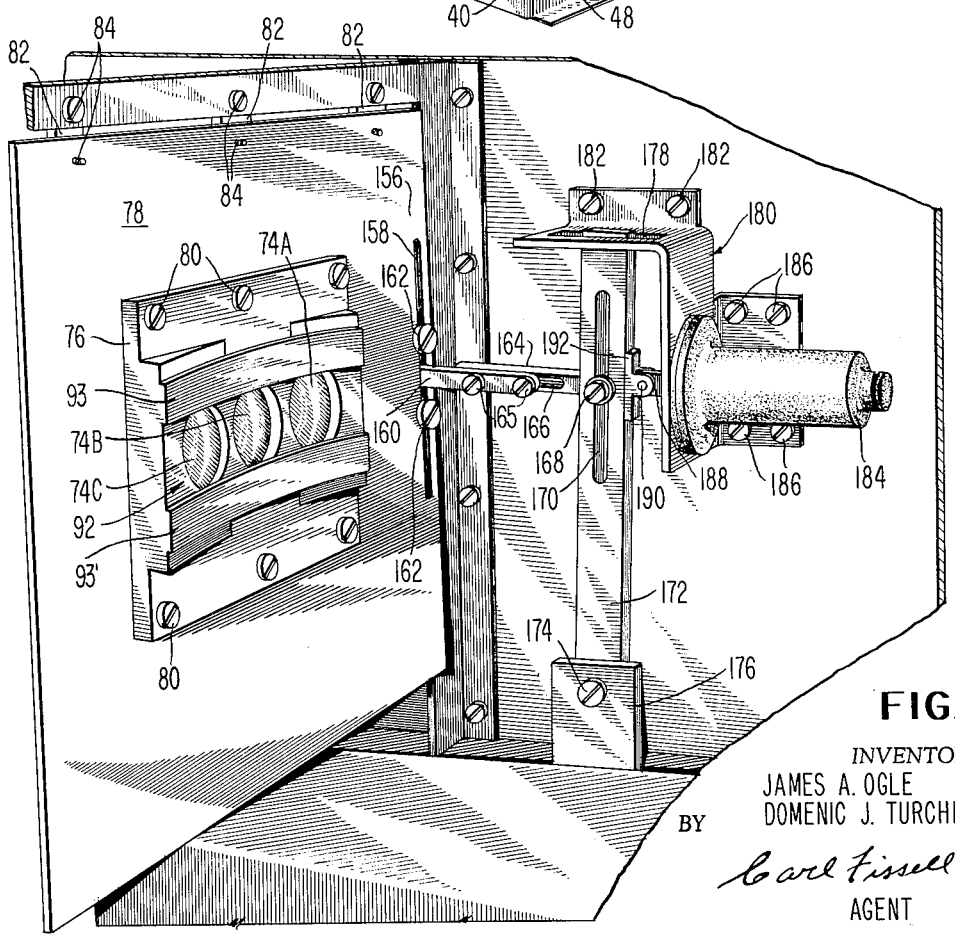
FIG. 2 is a view taken along the line 2—2 of FIG. 1 with certain portions of the apparatus broken away to expose the interior of the lamp lens chamber to view.

Referring to FIGS. 2 and 8 which will be discussed simultaneously, it is seen that a plurality of pairs of tandem mounted condensing lenses 74A, 74B and 74C, FIG. 2, are demountably secured on a radius in a channeled mounting member 76 attached to a frame or hanger member 78 by bolts 80. Frame 78 is pivoted at the top thereof to the rear portion of the central enclosure 12 by means of flexible tabs 82 depending therefrom and bolts 84 which secure the tabs to the enclosure as well as to the frame 78. A high wattage light source such as incandescent bulb 86, FIG. 8, is positioned adjacent each pair of condensing lens 74A, 74B and 74C and is or may be supported in a conventional manner by means of a tube socket of base connector 88. Power for the lamp 86 may be supplied from an electrical voltage source 90.

The three groups of condensing lenses 74 are disposed adjacent an opening 92 formed by upper and lower parallel field stops 93 and 93' respectively, for the optical system, for purposes to be explained hereinafter, and in the preferred and illustrated embodiment may be a central window or aperture in the metal frame 76—the latter being disposed transversely between the side walls of the central enclosure 12. The light output 94, FIG. 8, from the three light sources, is directed so as to pass through the field stops 93 and 93' to a Fresnel lens 96 acting as a collimating lens. The field stops are curved radially in order to satisfy the radial curvature of the field of the Fresnel lens 96. The lamp and condenser sets are likewise toed-in, i.e. arranged on a radius so as to image the filaments of the lamps into the projection or exit pupil, i.e., the Fresnel lens 96 such that the output from each lamp and condenser set substantially fills the entire area of the Fresnel lens. A lenticular optical member 98 disposed parallel and contiguous with the Fresnel lens 96 effectively spreads the horizontal light output field from the three light-lens sources to the desired degree thereby forming a continuous horizontal observer space.

By this means the present invention produces a high intensity light source 100, 100A, FIG. 3, and FIGS. 4A and D, visible to the well defined viewing space and to observer, e.g., aircraft therein. By suitably orienting the apparatus this observer space can be oriented with respect to the surface upon which it is mounted, namely the runway or the deck of a ship. Since the cells can be arranged to project at various angles, it is apparent that such members can be used to provide upper and lower visual output field limits, for approaching aircraft.

In order to offset or substantially eliminate the effects of adverse weather conditions for example, fog, rain, sleet, snow, etc., as well as to minimize or substantially eliminate the confusion of the observer resulting from other glide path apparatus or stray light fields adjacent or contiguous with the landing areas, the present invention includes means for applying intelligence i.e., coding, or field modulation, to the light field output. By this means the observer can ascertain whether or not he is within the display field. If intelligence is absent from the observed light the light can be ignored since this indicates that the observer is outside the desired observer space. It is desirable then to modulate the light so that it readily can be distinguished from other light and this modulation should be such that it will not appear outside of its prescribed field. The observer, e.g., pilot may thus reliably and efficiently recognize that he is in the specific display area of a particular cell and take whatever steps are required or necessary, to correct the attitude of his aircraft for a normal approach descent to the landing area.

Figure 5:
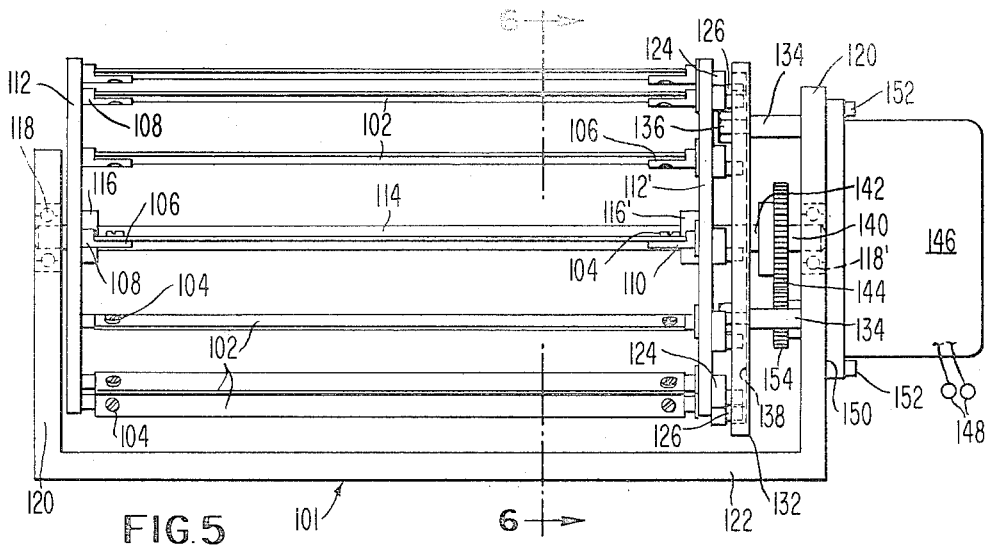
FIG. 5 is an elevational view of the optical scanning mechanism of the present invention.
Figure 6:
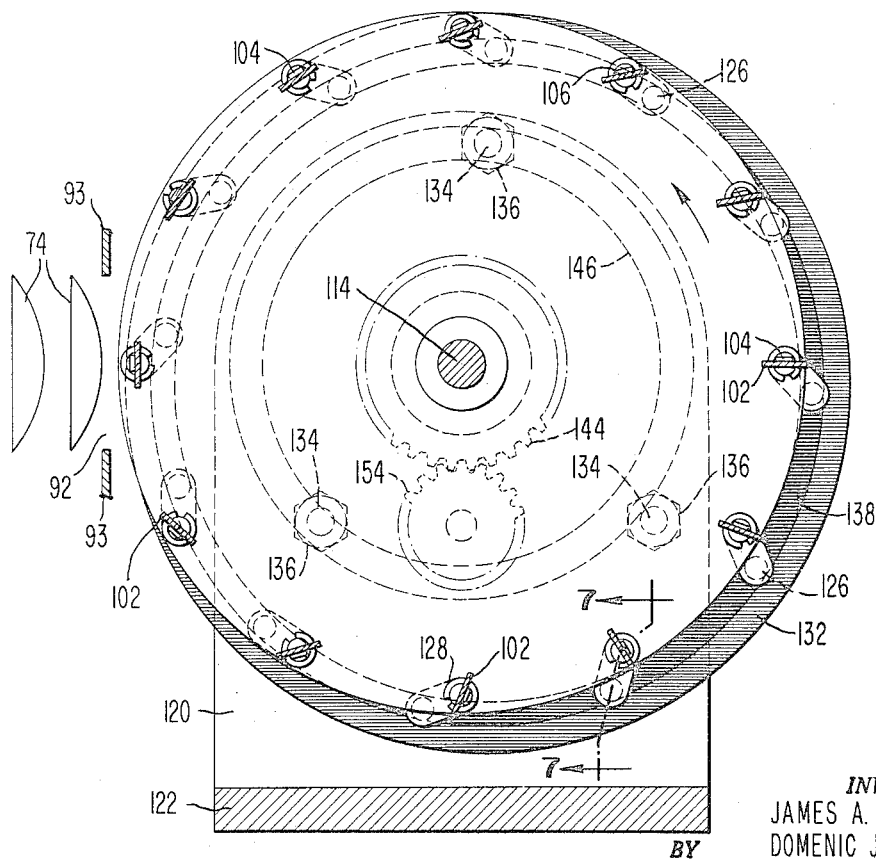
FIG. 6 is a view taken along the line 6—6 of FIG. 5.

The means for applying intelligence or coding to the light source or output field is seen with a reference to FIGS. 5, 6 and 8 to include a squirrel cage or ferris wheel assembly 101, FIG. 8, which is disposed adjacent the field stops 93–93′ and forward of the sets of condensing lenses 74.

As shown more particularly in FIG. 5, ferris wheel assembly 101 includes a plurality of elongated vanes or blades 102—12 in preferred embodiment—circularly arranged in parallel spaced apart relation and secured at opposite ends by screws 104 to flat recesses or ledge portions 106 of supporting members or holders 108 and 110 respectively. The holders 108 and 110 are rotatably disposed in oppositely confronting, spaced apart, circular, disc-like rotor members 112 and 112′ respectively. Each blade is or may be slightly V-shaped in cross-section in order to longitudinally stiffen and rigidify the same thereby preventing any warpage, vibration or bending during use.

A central shaft 114 extending between the two rotor members 112 and 112′ joins these members together with the blades 102 into a unitary assemblage—ferris wheel fashion—as seen most clearly in FIG. 5. Enlarged hubs 116 and 116′ on opposite ends of the shaft 114 act to maintain the rotors 112 and 112′ in spaced apart parallel relation along the shaft. Shaft 114 is journalled at its opposite ends in bearings 118 and 118′ respectively, press-fitted or otherwise secured in the upstanding portions 120 of a supporting frame 122.

Blade holders 110, as seen in the detail view of FIG. 7, are or may be formed integrally with an eccentric 124 and each carries a camming member or pin 126 projecting rightwardly therefrom for purposes to be explained shortly herein, while the blade supporting portion with its flat ledge 106 projects leftwardly therefrom. A C-ring 128 received in a groove 130 retains each holder 110 in place in the rotor 112.

Disposed adjacent and parallel to the rotor 112′ is a cam plate 132 which is secured as by bolts 134 and nuts 136 to the supporting frame 122. As seen most clearly in FIG. 6, the camming plate is provided with an eccentrically disposed camming groove 138 therein into which the projecting pins 126 are received and ride therearound as the shaft 114 is rotated in a manner now to be explained.

The rightward end 140 of shaft 114 which, as seen in FIG. 5, projects through an aperture 142 in camming plate 132, carries a toothed gear wheel 144 thereon secured thereto in a known manner. An electric driving motor 146 energizable over the leads 148 from a source of electrical energy (not shown) is mounted on the outside wall or face 150 of the vertical portion 120 of the frame 122 by means of the bolts 152. A drive pinion gear 154 secured to or operably associated with the motor drive shaft (not shown) is in mesh with and drives gear 144, thereby to rotate shaft 114 when the electric motor is suitably energized.

Rotation of the shaft 114 by the motor 146 rotates the discs 112–112′ causing the eccentric 126 to follow the eccentric groove 138 in the fixed cam plate member 132. As each blade 102, FIGS. 6 and 9, approaches the opening 92 between the field stops 93–93′ it is thereby angularly rotated about its long axis into a position to pass across the opening substantially parallel to the field stops thereby to occlude the light in a portion of the area defined by the field stops in the manner shown schematically in FIG. 8. As each blade passes beyond the stops it is angularly oriented so as to present its thinnest aspect as it once again passes through the light on its circular path of movement.

Temperature compensation of desired or required, for the present invention is or may be achieved in a simple manner with the apparatus shown in FIG. 2. The plate 78 supporting the field stops 92 and the three groups of pairs of tandem mounted, demountable, condensing lenses 74 is provided at its rightward edge 156, FIG. 2, with an elongated slot 158. A short link 160 pivotally mounted by bolts 162 adjacent the slot on the opposite side of the plate 78 from that seen in FIG. 2, is adjustably secured to the leftward end of the link 164 by bolts 165 which pass through both links and is slidable in the slot 166 in link 164. The rightward end of link 164 is secured to a bolt 168 bearing a washer, which is slidable vertically upwardly and downwardly in a slot 170 in link 172. The latter is pivoted by a bolt 174 to a block 176 in the base of the apparatus. The rocking excursions, leftwardly and rightwardly, of the link 172 are constrained by means of the slot 178 in the L-shaped bracket 180 attached to the wall of the "high-low cell" by means of bolts 182.

An enclosed volumetric expansion-bellows 184 mounted to the depending portion of the bracket 180 by means of bolts 186 has its plunger 188 pivoted by means of the pin 190 to a bracket 192 which is secured by bolts 194 to the vertical link 172. Changes in the focal length or optical power of the objective Fresnel lens 96 as a result of temperature changes are thus compensated for by means of the aforementioned linkage, FIG. 2, e.g., rocking the plate 78 forwardly and rearwardly a slight distance. The Fresnel lens is suitably mounted so as to accommodate dimensional changes resulting from temperature variations.

Since it is known that visible variations in candlepower or simple "on-off" switching of illumination are unreliable clues as to the source of visual radiation, and since it is necessary in the hazardous occupation of flying to provide an exact indication of whether the pilot's position is above or below a certain reference position, the present invention contemplates a system wherein the light content is maintained constant. That is, the whole amount of light going through the optics of the system is kept at a desired and pre-arranged level. The light is coded so that it is easily distinguishable from other lights or sources of information i.e., the observer will immediately known what he is viewing and the coding is performed by means of apparatus which prevents such coding from being visible outside of its assigned observer space. Thus when the viewer is not supposed to see the modulated light he will not see it. Conversely, when he does see the light he will be able to identify it and understand that he is within the assigned observer area so that the beam will appear to be modulated and its significance will be understood. In order to define sharply the upper and lower boundaries of the light output field, i.e., the dihedral space in which the light output is visible, the field stops 93–93′ are located substantially at the best focus for the particular optics involved. The vanes 102 are oriented so as to pass relatively close to the field stops. As hereinbefore mentioned, in order not to reduce the light output appreciably, as each vane 102 approaches the field stops 93–93′ the camming arrangement illustrated in FIGS. 6, 7 and 9 causes the broadest aspect of the vane to be substantially parallel with the field stops for an appreciable percent of its passage within or across the open area 92 between the stops. Whereas, upon leaving the area adjacent the field stops the vanes are rotated about their long axes angularly, i.e., are feathered from the occluding position to positions such that their thin aspect lies parallel with the chief rays, that is, along a line drawn through the center of the field stops to the positions of the blades. The modulation that they impose in the latter phase of the cycle and the amount of light that they occlude as they pass through this area becomes negligible.

As described herein duty ratio with reference to the observer or as seen by the observer is defined as the "on" time divided by the "total" time. By a cycle is meant the period defined by the sequence of open and closed or "on" and "off." The repetition rate is defined as the frequency or the number of times the cycle is repeated. Thus the relationship between the width of the opaque blades and the width of the open area between the field stops determines the duty cycle, i.e., what fraction or percent of "on" time there is, or what portion of the light is actually occluded. These relationships are made to be adjustable. In the illustration shown in FIGS. 8 and 9, there is approximately 2½ to 3 to 1 on to off relationship. If these relationships were made equal it would be half on and half off. If more "off time" is desired, wider blades can be used. It is desirable that the field stop height i.e., the distance between the two field stop members 93—93 be an integral multiple of the circumferential pitch from blade to blade or fairly close to it for the purpose of assuring that the total light flux leaving the system remains essentially constant so that the amount of scattered light in the system is not modulated.

As can be seen the speed of rotation of the squirrel cage differentiates the "high" from the "low" cell indication.

In the preferred and illustrated embodiment of the present invention, as seen more particularly in FIG. 4, the relationship of the high to the low cell as far as the repetition rate of the observed indication is concerned is approximately 40 to the minute with respect to the high cell 56 and approximately 90 to the minute for the low cell 58. This is exemplified more particularly by the rectangular wave pulse indications 196 and 198 for the high and low cells, respectively.

As seen in FIGS. 3 and 4, with an observer at the position 66A, FIG. 3, a 40 to the minute flashing output field indication FIG. 4A would be visible. Obviously the observer would see the well defined rectangle of light only if he were relatively close to the cell. With the observer in the position 66B an indication 72, FIG. 4B, would be viewed. With the observer in position 66, FIG. 3, an "on course" indication 4C would be observed. With the observer in the position of 66C an output indication 72 4D would be seen. And finally, if the observer were located in the position 66D, FIG. 3, a ninety to the minute flashing output field indication, FIG. 4E would be observed indicating that the aircraft was too low and in danger of striking obstacles such as buildings, etc., located along his approach course.

What is claimed is:

1. Optical field scanning apparatus in which the total amount of light remains substantially constant and unmodulated comprising:
    (a) a source of high intensity light,
    (b) means adjacent said source of light for defining a desired light output,
    (c) means disposed intermediate the light source and said field defining means for projecting the light in a manner causing said light effectively to embrace said field defining means,
    (d) light collimating means disposed in the path of said light output,
    (e) light interrupting means intermediate said field defining means and said collimating means having a well defined path of operation and being effective during its passage through one portion of said path of operation to occlude a substantially constant portion of the area of said output field defining means thereby applying intelligence to said light output in the form of a visually recognizable change in its interruption rate effective to cause the light to appear to flash on and off, and whereby the light interrupting means during its passage through a remote portion of the path of operation thereof as a result of the interrupting means being out of the plane of said field defining means is substantially out of focus so that the light output is effectively non-modulated and thus does not appear to flash, and
    (f) means to substantially increase the horizontal angle of view of said light output with respect to the position of the observer relative to the source of light thereby producing a continuously defined output field of visual illumination in which the light within the field is substantially constant.

2. Optical field scanning apparatus in which the total amount of light remains substantially constant and unmodulated comprising:
    (a) a source of high intensity light,
    (b) means adjacent said source of light for defining a desired light output field,
    (c) means disposed intermediate said source and said field defining means for projecting said light in a manner causing the same effectively to embrace said field defining means,
    (d) light collimating means disposed in the path of said light output,
    (e) rotatable light interrupting means intermediate said field defining means and said collimnating means including arcuately movable members effective during passage across said output field to occlude a substantially constant portion of the area of said output field defining means so as to produce a visually recognizable change in its interruption rate whereby the light output appears to flash on and off, and whereby the light interrupting means is substantially out of focus during its passage through a remote portion of the path of operation thereof as a result of the interrupting means being out of the plane of said field defining means so that the light output is effectively non-modulated and thus does not appear to flash, and
    (f) means to substantially increase the horizontal angle of view of said light output with respect to the position of the observer relative to the source of the light thereby producing a continuously defined output field of illumination in which the light within the field is substantially constant.

3. Optical field scanning apparatus in which the total amount of light remains substantially constant and unmodulated comprising:
    (a) a source of high intensity light,
    (b) means adjacent said source of light for defining a desired light output field,
    (c) means disposed intermediate said source and said field defining means for projecting said light in a manner causing the same effectively to embrace said field defining means,
    (d) light collimating means disposed in the path of said light output,
    (e) rotatable light interrupting means including one or more arcuately movable elongated planar members intermediate said field defining means and said collimating means and effective in a first position to occlude a substantially constant portion of the area of said output field defining means during passage through one portion of the path of operation thereof so as to apply intelligence to said light output in the form of a visually recognizable change in the light output interruption rate thereby to cause the light output to appear to flash on and off, and whereby the light interrupting means in a second position is substantially out of focus during its passage through another portion of the path of operation thereof as a result of the interrupting means being out of the plane of said field defining means so that the light output is effectively non-modulated and thus does not appear to flash,
    (f) means for moving said planar member from said first position to said second position, and
    (g) means to substantially increase the horizontal angle of view of said light output with respect to the position of the observer relative to the source of light thereby producing a continuously defined output field of illumination in which the light within the field is substantially constant.

4. Optical field scanning apparatus in which the total amount of light remains substantially constant and unmodulated comprising:
(a) a source of high intensity light,
(b) means adjacent said source of light for defining a desired light output field,
(c) means disposed intermediate said source and said field defining means for projecting said light in a manner causing the same effectively to embrace said field defining means,
(d) light collimating means disposed in the path of said light output,
(e) rotatable light interrupting means intermediate said field defining means and said collimating means, said light interrupting means including a plurality of parallel spaced movable blade members, and further including means for changing the relative orientation of said blade members with respect to each other and to the field stop means so as to present the flat portion of the blades to the light in one orientation and to present the edge of the blades to the light in another orientation, said blades thereby being effective in a first position to occlude a substantially constant portion of the area of said output field defining means during passage through one portion of the path of operation thereof so as to apply intelligence to said light output in the form of a visually recognizable change in the light output interruption rate thereby to cause the light output to appear to flash on and off, and whereby the light interrupting means in a second position is substantially out of focus during passage of said blades through another portion of the path of operation thereof as a result of being out of the plane of said field defining means so that the light output is effectively non-modulated and thus does not appear to flash,
(f) means operably coupled thereto for moving said blade members from said first position to said second position, and
(g) means to substantially increase the horizontal angle of view of said light output with respect to the position of the observer relative to the source of the light thereby producing a continuously defined output field of illumination in which the light within the field is substantially constant.

5. The invention in accordance with claim 4 wherein said light interrupting means comprises a squirrel cage-like mechanism in which the blade members for occluding the light are disposed with their long axes parallel to the plane of the field defining means and wherein the means for changing the orientation of the occluding means includes a follower associated with each occluding member and a cam groove for arcuately positioning each blade.

6. Optical field scanning apparatus in which the total amount of light remains substantially constant and unmodulated comprising:
(a) a source of high intensity light,
(b) means adjacent said source of light for defining a desired light output field,
(c) means disposed intermediate said source and said field defining means for projecting said light in a manner causing said light effectively to embrace said field defining means,
(d) thermally responsive means operably associated with said last mentioned means for changing the angular orientation of said output field defining means and said last named means effective to compensate for any temperature variations within the apparatus,
(e) light collimating means disposed in the path of said light output,
(f) rotatable light interrupting means intermediate said field defining means and said collimating means and being effective in one orientation to occlude a substantially constant portion of the area of said output field defining means during its passage through one portion of the path of operation thereof thereby applying intelligence to said light output in the form of a visually recognizable change in its interruption rate effective to cause the light output to appear to flash on and off, and whereby the light interrupting means in substantially out of focus during its passage through a remote portion of the path of operation thereof as a result of the interrupting means being out of the plane of said field defining means so that the light output is effectively unmodulated and thus does not appear to flash, and,
(g) means to substantially increase the horizontal angle of view of said light output with respect to the position of the observer relative to the source of light thereby producing a continuously defined output field of illumination in which the light within the field is substantially constant.

References Cited by the Examiner
UNITED STATES PATENTS

| | | | |
|---|---|---|---|
| 1,466,701 | 9/1923 | Forest | 250—199 |
| 2,506,946 | 5/1950 | Walker | 250—199 |
| 2,582,728 | 1/1952 | Walker | 88—1 |

THOMAS B. HABECKER, *Acting Primary Examiner.*
NEIL C. READ, *Examiner.*